United States Patent [19]
Roy et al.

[11] Patent Number: 6,134,653
[45] Date of Patent: Oct. 17, 2000

[54] RISC PROCESSOR ARCHITECTURE WITH HIGH PERFORMANCE CONTEXT SWITCHING IN WHICH ONE CONTEXT CAN BE LOADED BY A CO-PROCESSOR WHILE ANOTHER CONTEXT IS BEING ACCESSED BY AN ARITHMETIC LOGIC UNIT

[75] Inventors: Subhash C. Roy, Stamford; Paul Hembrook, New Milford; Eugene L. Parrella, Monroe; Richard Mariano, Bethel, all of Conn.

[73] Assignee: TranSwitch Corp., Shelton, Conn.

[21] Appl. No.: 09/064,446

[22] Filed: Apr. 22, 1998

[51] Int. Cl.[7] ................................................ G06F 9/48
[52] U.S. Cl. ........................ 712/228; 709/109; 712/41
[58] Field of Search ........................ 709/9, 108; 712/41, 712/228

[56] References Cited

U.S. PATENT DOCUMENTS

| | | | |
|---|---|---|---|
| 4,853,849 | 8/1989 | Bain, Jr. et al. ........................ | 711/202 |
| 5,179,682 | 1/1993 | Jensen ...................................... | 711/118 |
| 5,357,617 | 10/1994 | Davis et al. .............................. | 712/245 |
| 5,524,250 | 6/1996 | Chesson et al. .......................... | 712/228 |
| 5,564,057 | 10/1996 | Hardewig et al. ....................... | 711/209 |
| 5,680,641 | 10/1997 | Sidman ..................................... | 710/20 |
| 5,721,868 | 2/1998 | Yung et al. ............................... | 711/149 |
| 5,812,868 | 9/1998 | Moyer et al. ............................. | 712/23 |
| 5,903,919 | 5/1999 | Myers ...................................... | 711/220 |

OTHER PUBLICATIONS

Computer Organization and Design, by J. Hennessy and D. Patterson, 1997, Morgan Kaufmann Publishers, Inc., pp 434–536.

MIPS RISC Architecture by G. Kane and J. Heinrich, Prentice Hall PTR, 1992, Chapters 1–3, Chapter 6.

Article entitled Fast Context Switching in Real-time Propositional Reasoning by Nayak and Williams, in Proceedings of AAAI–97, 7 pages.

*Primary Examiner*—Kenneth S. Kim
*Attorney, Agent, or Firm*—David P. Gordon; David S. Jacobson; Thomas A Gallagher

[57] ABSTRACT

A RISC processor includes a sequencer, a register ALU (RALU), data RAM, and a coprocessor interface. The sequencer includes an N×32 bit instruction RAM which is booted from external memory through the coprocessor interface. The RALU includes a four port register file for storage of three contexts, and an ALU. The ISA (instruction set architecture) according to the invention supports up to eight coprocessors. An important feature of the invention is that multiple sets of general purpose registers are provided for the storing of several contexts. According to a presently preferred embodiment, three sets of general purpose registers are provided as part of the RALU and a new opcode is provided for switching among the sets of general purpose registers. With multiple sets of general purpose registers, context switching can be completed in three processing cycles. In addition, one set of general purpose registers can be loaded by a coprocessor while another set of general purpose registers is in use by the ALU. According to a presently preferred embodiment, each of the three sets of general purpose registers includes twenty-eight thirty-two bit registers. In addition, according to the presently preferred embodiment, a single set of four thirty-two bit registers is provided for use in any context. The set of common registers is used to store information which is used by more than one context.

20 Claims, 6 Drawing Sheets

RISC PROCESSOR ARCHITECTURE WITH HIGH PERFORMANCE CONTEXT SWITCHING IN WHICH ONE CONTEXT CAN BE LOADED BY A CO-PROCESSOR WHILE ANOTHER CONTEXT IS BEING ACCESSED BY AN ARITHMETIC LOGIC UNIT

BACKGROUND OF THE INVENTION

1. Field of the Invention

The invention relates to reduced instruction set computer (RISC) processor architecture. More particularly, the invention relates to a processor architecture designed to substantially improve processing speed in real time I/O intensive applications.

2. State of the Art

One of the many known methods for increasing throughput in a microprocessor is known as "pipeline processing". Pipeline processing involves overlapping the execution of several instructions by temporally offsetting each subsequent instruction. In order to implement pipeline processing effectively, it is preferable that each instruction in the processor's instruction set utilize the same number of clock cycles. For example, in a case where each instruction utilizes exactly n-number of clock cycles, a pipeline of n-number of instructions can be created with each subsequent instruction being offset from the previous instruction by one clock cycle. In such a system of pipeline processing, the processor effectively processes one full instruction each clock cycle. One of the achievements of RISC processor design is the definition of an instruction set in which the execution of all, or most, instructions require a uniform number of cycles. A discussion of the general background of RISC can be found in "MIPS R-2000 RISC Architecture" by G. Kane (Prentice Hall, 1987) the complete disclosure of which is hereby incorporated by reference herein.

A popular prior art RISC architecture is the MIPS I Instruction Set Architecture (ISA). MIPS is a simple but high performance RISC architecture which has attracted enormous third-party support. The MIPS I and MIPS II ISAs are well documented in "MIPS RISC Architecture" by G. Kane and J. Heinrich (Prentice Hall, 1992), the complete disclosure of which is hereby incorporated by reference herein.

The MIPS R-2000 processor executes instructions in five portions (one per clock cycle) and the instruction pipeline is a five stage pipeline, one stage per instruction portion. The five instruction portions are instruction fetch (IF), read operands from registers while decoding instruction (RD), perform operation on instruction operands (ALU), access memory (MEM), and write back results to a register (WB). Prior art FIG. 1 illustrates the MIPS pipeline with five instructions offset from each other by one clock cycle. As shown in FIG. 1, during the cycle in which the first instruction is writing back results to a register (WB), the second instruction is accessing memory (MEM), the third instruction is performing an operation on instruction operands (ALU), the fourth instruction is reading operands from registers while decoding instruction (RD), and the fifth instruction is fetching the instruction (IF) from instruction RAM. Additional background on the MIPS pipeline may be found in "Computer Organization and Design: the Hardware/Software Interface", by D. A. Patterson and J. L. Hennessey (Morgan Kauffmann, 1994), the complete disclosure of which is hereby incorporated by reference herein.

The instruction pipeline in RISC architecture achieves a certain amount of operational "parallelism". In the example shown in FIG. 1, once the pipeline is full, five instructions are executed in parallel. Although each instruction still requires five clock cycles, a new instruction can be added to the pipeline each clock cycle to keep the pipeline full. So long as the pipeline is full, the RISC processor may continue to process instructions at the effective rate of one instruction per clock cycle, provided there are no stall cycles, NOP instructions, or aborted pipelines.

Those skilled in the art will appreciate that inherent latencies exist for load, jump, and branch instructions and that some instructions may require data which is not yet available. These conditions are referred to as processing interdependencies. One way to resolve interdependencies is to stall or delay the pipeline. Another way (utilized by the R-2000) is to insert NOP (no operation) instructions in the pipeline to account for latency between instructions. The insertion of NOP instructions is effected by the software assembler when a program is compiled. It will also be understood that exceptions (e.g., interrupts) interfere with the smooth flow of the pipeline. When an R-2000 detects an exception, for example, the instruction causing the exception is aborted and all instructions in the pipeline which have started execution are aborted. A jump to the designated exception handler occurs. After the exception is processed, the processor returns to the instruction which preceded the instruction which was executing when the exception occurred. Interrupt handling robs processor cycles and degrades system performance. If interrupt handling is not efficient, the performance advantages of pipeline processing may be lost.

Most modern processors, including RISC processors, support multiple simultaneous processes and/or multithreaded processes. When running several different programs on a single processor (multiple simultaneous processes) or when running a multithreaded processes, it is necessary for the processor (or operating system) to switch from one program or thread (context) to another. Context switching is often performed according to a priority schedule whereby some processes are given more processing time than others. Theoretically, context switching can improve system performance by switching to a new context whenever a process or thread is stalled waiting for an I/O device and by returning to the stalled process or thread when it is ready to run. In practice, however, context switching tends to prevent optimum system performance because extra processing cycles (128 cycles in the case of a MIPS processor) must be used to switch contexts and no process instructions are executed during the context switch. During a context switch, the contents of all immediate registers (also called general purpose registers, i.e. registers which are directly read from or written to by the ALU of the processor) which describe the state of the current process are saved to RAM before switching to another process. After saving the current state (context), the next context is loaded from RAM into registers before the next process can be run. This nonproductive processor activity (saving and restoring register contents) can adversely affect overall performance, particularly in a real time event driven system where context switches are largely governed by I/O activity.

Even with a single thread program, context switching may occur often. For example, the MIPS R-2000 ISA has two operating modes: user mode and kernel mode. Each of these modes is a different context and the programmer may create several "user mode" contexts, each for a different thread. However, even with a single user mode context, context switching between the user mode context and the kernel context may occur frequently. According to the MIPS ISA, the CPU enters the kernel mode whenever an exception is detected and remains in kernel mode until a Restore From Exception (RFE) instruction is executed. Consequently, in an event driven application, frequent context switches can be expected regardless of the number of threads-in user modes.

The relative high speed of RISC processors make them an ideal choice for telecommunications applications including SONET and ATM applications. Despite the power of RISC processors, however, the extremely high demands of SONET and ATM telecommunications tax the resources of RISC processors, particularly with regard to interrupt handling and context switching. It will be appreciated that telecommunications in general is almost entirely real time event driven and that the high volume, broad band communications provided via SONET and ATM is even more so.

SUMMARY OF THE INVENTION

It is therefore an object of the invention to provide a processor architecture which is particularly well suited for telecommunications applications.

It is also an object of the invention to provide a processor architecture which is particularly well suited for real time event driven applications.

It is another object of the invention to provide a processor architecture which is ideally suited to interrupt handling and context switching.

It is still another object of the invention to provide an improved context switching architecture in a RISC processor which is readily supported by third-party products.

In accord with these objects which will be discussed in detail below, the RISC processor of the present invention is similar to a MIPS R-2000 processor with several modifications which are designed to optimize the processor for use in telecommunications applications such as SONET and ATM applications and to generally optimize its performance for real time event driven applications. More specifically, the processor of the invention broadly includes a sequencer, a register ALU (RALU), an optional (preferable) data RAM, and a coprocessor interface. The sequencer includes an N×32 bit instruction RAM (IRAM) which is booted from external memory through the coprocessor interface. The RALU includes an ALU and a multiport register file implemented as a plurality of general purpose registers which are arranged to accommodate three contexts. According to a presently preferred embodiment, the multiported register file includes three sets of general purpose registers and a new opcode is provided for switching among the sets of general purpose registers. With multiple sets of general purpose registers, context switching can be completed in three processing cycles. In addition, one set of general purpose registers can be loaded by a coprocessor while another set of general purpose registers is in use by the ALU. According to a presently preferred embodiment, each of the three sets of general purpose registers includes twenty-eight thirty-two bit registers. In addition, according to the presently preferred embodiment, a single set of four thirty-two bit common registers is provided for use in any context. The set of common registers is preferably used to store information which is used by more than one context. With the three sets of general purpose registers, the processor of the invention services interrupts approximately 10–12 times faster than a standard MIPS R-2000 processor.

According to the preferred embodiment of the invention, the data RAM is preferably M×32 bits, is byte addressable, and is preferably implemented with asynchronous SRAM.

The RISC processor of the invention is designed to operate within most of the MIPS ISA with a few instructions ignored and several new instructions added. Accordingly, consistent with the MIPS ISA, the sequencer is treated as coprocessor 0 and coprocessor 1 is reserved for a floating point unit. Whereas the MIPS ISA only provides for two additional coprocessors (for a total of four), the ISA according to the invention supports up to six additional coprocessors (for a total of eight). According to the invention, all logic external to the processor is accessed through one of the (six) coprocessor interfaces.

The processor's pipeline, interblock communication, and clocking scheme have been designed to operate in an ASIC implementation from a VHDL model which utilizes most of the MIPS I ISA (except for features which are not relevant to telecommunications and other I/O intensive applications) with the enhancements described herein. Most of the new instructions in the ISA of the invention deal with coprocessor functionality, exception processing, and context switching.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 2:
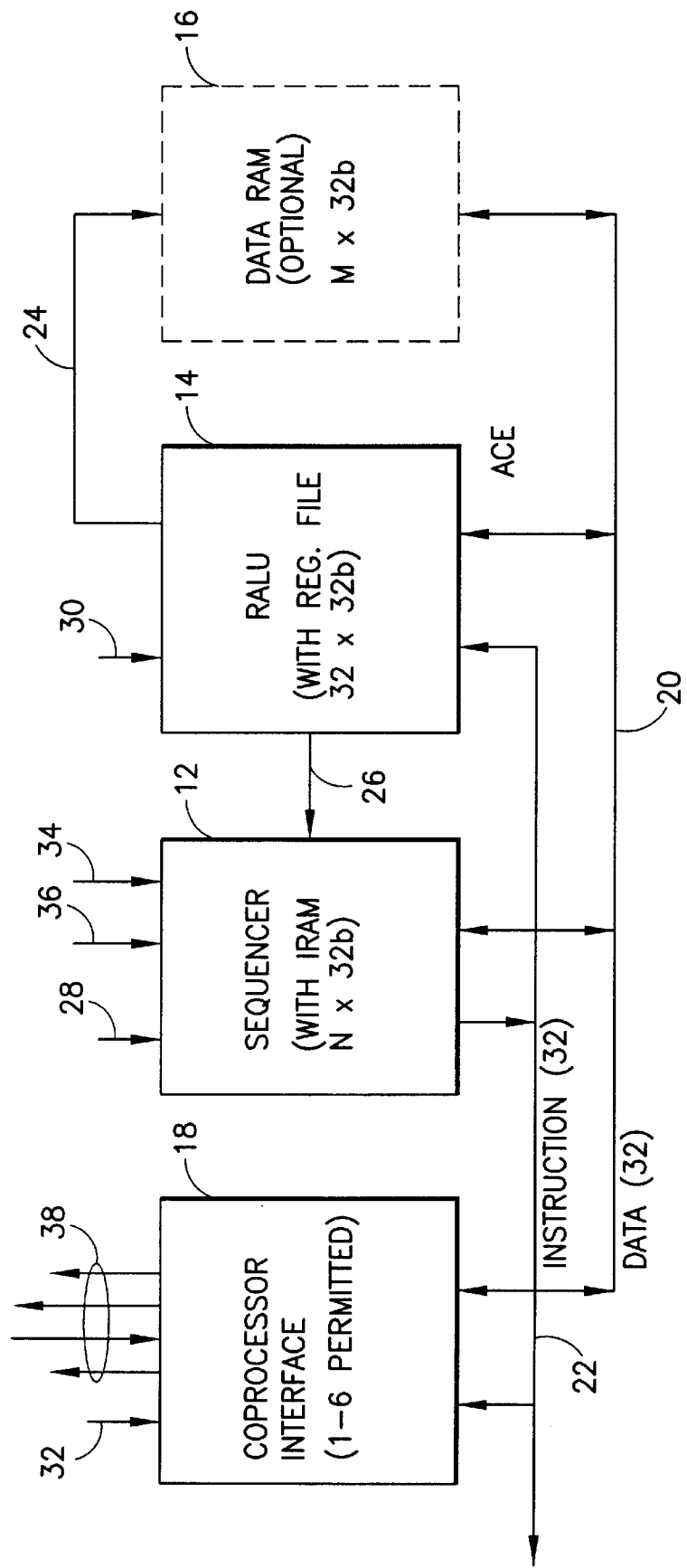
FIG. 2 is a schematic block diagram of the major functional blocks of a processor according to the invention.

Referring now to FIG. 2, a processor 10 according to the invention generally includes a sequencer 12, a register ALU (RALU) 14, data RAM 16, and a coprocessor interface 18, each being coupled to a thirty-two bit data bus 20. The data RAM 16 is not essential to the operation of the processor, but is preferable for most applications. The data RAM is preferably M×32 bits, is byte addressable, and is preferably implemented with asynchronous SRAM. The sequencer 12 is coupled to the RALU 14 and the coprocessor 18 by a thirty-two bit instruction bus 22 whereby instructions fetched by the sequencer from IRAM are made available to the RALU and the coprocessor(s) as described in more detail below. When data RAM 16 is provided, it is controlled by the RALU, 14 via a control link 24. Flags for conditional instructions and traps are passed by the RALU to the sequencer 12 via a flag line 26. It will be appreciated that the sequencer 12, RALU 14, and coprocessor interface 18 each have a clock/reset input 28, 30, 32 respectively. In addition, the sequencer has an interrupt request input 34 as well as a coprocessor condition flag input 36. It will also be understood that the coprocessor interface 18 is provided with I/O lines 38 for coupling to a coprocessor.

Figure 1:
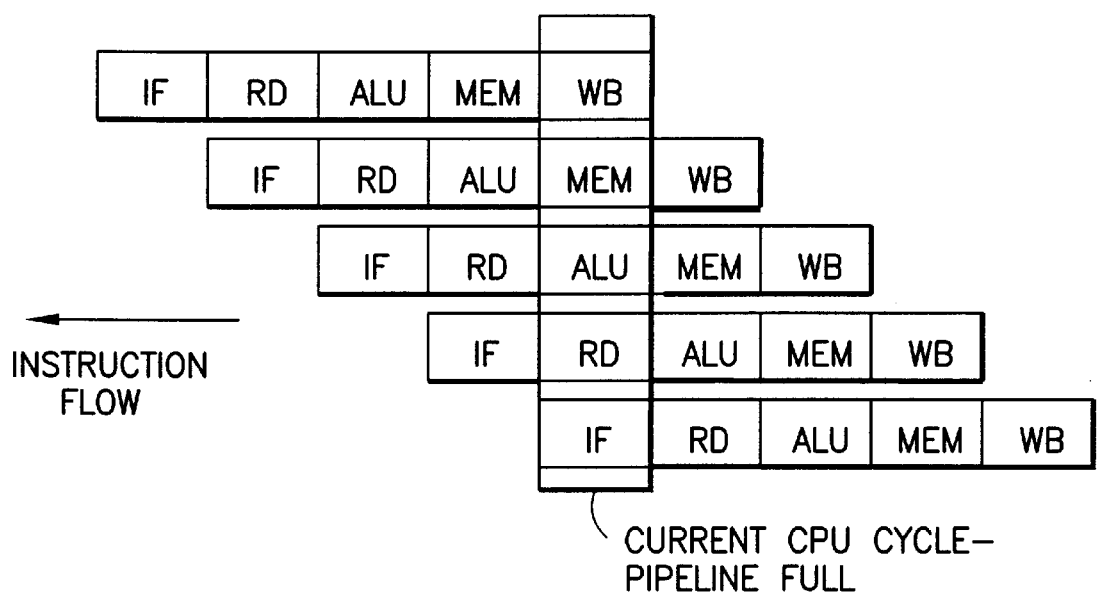
FIG. 1 is a diagram of prior art pipeline instruction processing in a MIPS processor.

As mentioned above, the presently preferred processor 10 according to the invention is based on the MIPS R-2000 ISA with several significant differences. Accordingly, the processor utilizes five pipeline stages substantially the same as shown in prior art FIG. 1. However, the mnemonics for each stage have been changed slightly. The five instruction stages referred to herein are: instruction fetch (IF), source fetch (SF), execution (EX), memory access (M), and write back (WB). In addition, as with the MIPS ISA, the sequencer is addressed as coprocessor 0 and coprocessor 1 is assumed to be a floating point unit. According to a presently preferred embodiment of the invention, a floating point unit is not used and six additional coprocessor addresses (2–7) are provided to support six additional coprocessor interfaces and coprocessors.

Figure 3:
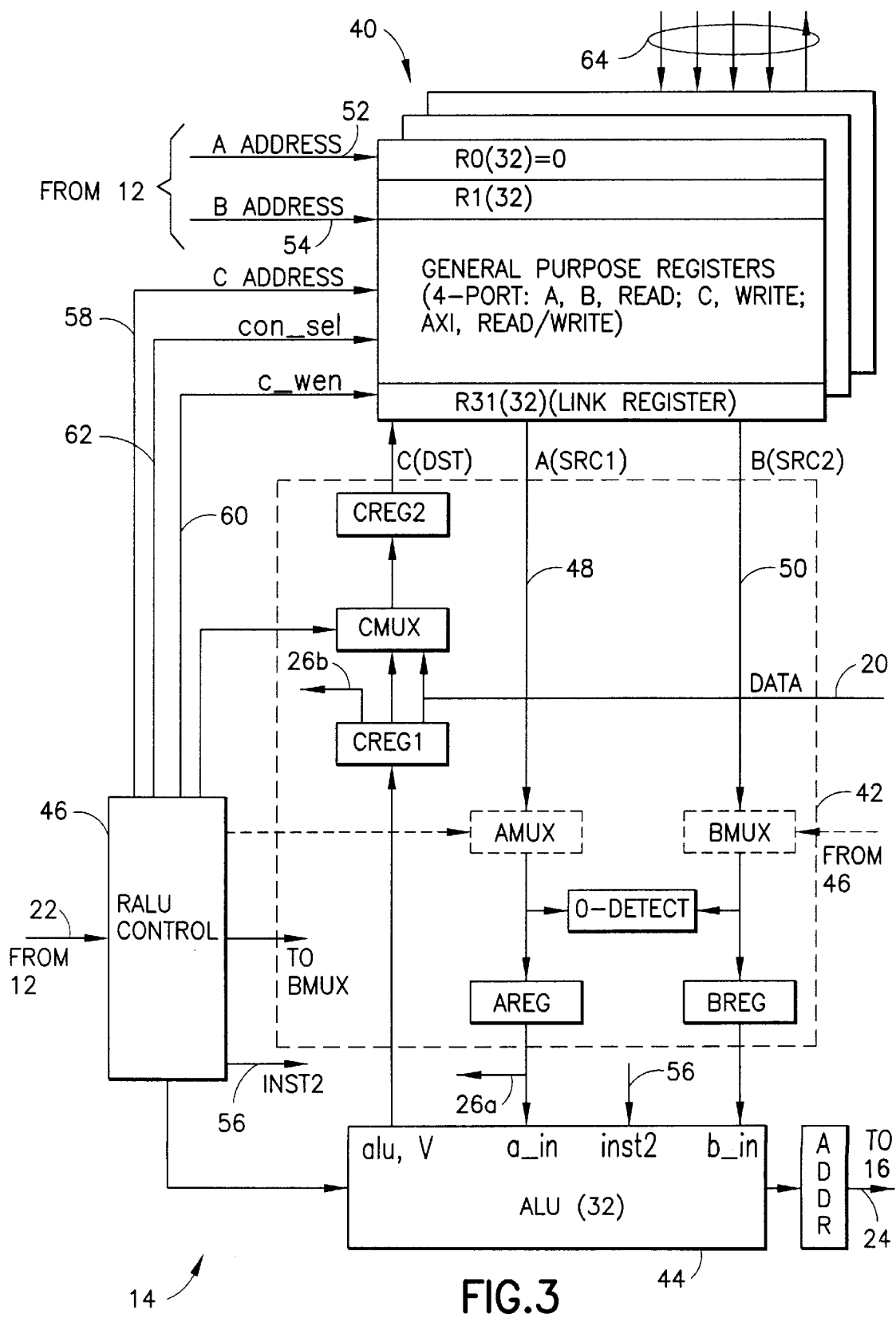
FIG. 3 is a schematic block diagram of the major functional blocks of the RALU of FIG. 2.

Turning now to FIG. 3, the RALU 14 according to the invention generally includes a register file 40 which includes a plurality of general purpose registers, a number of datapath multiplexers and registers 42, an arithmetic logic unit (ALU) 44, and an RALU controller 46. In particular, in the preferred embodiment, the register file 40 preferably includes (as shown and described in more detail below with reference to Table 1) three sets of general purpose registers 40a, 40b, 40c and a common set of general purpose registers 40d. Read access to the register file 40 is provided via two ports: an A port 48 and a B port 50. This preserves MIPS ISA compatibility by which operands A and B are accessed. Registers read via these ports are addressed via address lines 52, 54 by the sequencer (12 in FIG. 2) through fixed five bit (MIPS compatible) address fields in the instructions. Other fields of the instructions from the sequencer (12 in FIG. 2) are received by the RALU controller 46 at the start of the IF stage and are decoded by the RALU controller at the start of the SF stage. The operands which are fetched from the general purpose registers 40 are passed to registers AREG and BREG for use by the ALU 44 during the EX stage where the decoded instruction received by the ALU 44 from the RALU controller 46 is executed by the ALU. Immediate instructions (inst2) are provided to the ALU via the connection 56 to the controller 46. If the data RAM is to be read or written as the result of an instruction, the ALU 44 addresses the data RAM via line 24. More specifically, for load and store instructions the data RAM address "base+offset" is computed by the ALU during the EX stage with the base being taken from AREG and the offset being taken from inst2 at 56. Signals for read, write, sign, and byte enable are applied to the data RAM at the start of the M stage. In the event of a load instruction, the data from the data RAM 16 is returned to the RALU via the data bus 20 at the end of the M stage. In the event of a store instruction, the data to be stored is read from the B port into the BREG during the SF stage and passed through the ALU 44 to the CREG1. It is then applied from CREG1 to the data bus 20 during the M stage. In general, all outgoing data from the RALU passes through the CREG1, including the overflow flag V which is passed by line 26 (26b) to the sequencer. At the end of the EX stage, data output is written to CREG1. If the data is destined for a general purpose register, it is moved to CREG2 at the end of the M stage and written to the register via the C port at the end of the WB stage. The address of the register to be written is selected by the RALU control 46 via the line 58 and writing is enabled via the lines 60. According to a presently preferred embodiment, three lines are provided at 60, each for a separate write enable signal (c_wen0, c_wen1, c_wen2) for each of three register sets. Jump addresses and flags which result from reading the A port are passed directly from AREG to the sequencer via line (26a) in order to preserve MIPS compatibility. In addition, MIPS requires certain direct paths to AREG and BREG which, for clarity, are not shown in FIG. 3. These paths include paths from the ALU output, CREG1, the data bus 20, and from CREG2.

As mentioned above, one of the most important aspects of the processor of the invention is that the register file 40 is arranged as three sets of general purpose registers 40a, 40b, 40c (Table 1) and one set of common general purpose registers 40d. A standard MIPS processor has thirty-two (##0–31) general purpose registers, each register being thirty-two bits wide. The arrangement of general purpose registers according to the invention is illustrated in Table 1.

TABLE 1

| # | Register Address | 40a Con_sel=00 | 40b Con_sel=01 | 40c Con_sel=10 |
|---|---|---|---|---|
| 31 | 11111 | Context0_gp_reg31 | Context1_gp_reg31 | Context2_p_reg31 |
| 30 | 11110 | Context0_gp_reg31 | Context1_gp_reg30 | Context2_gp_reg30 |
| . | . | . | . | . |
| . | . | . | . | . |
| . | . | . | . | . |
| 5 | 00101 | Context0_gp_reg5 | Context1_gp_reg5 | Context2_gp_reg5 |
| 4 | 00100 | Context0_gp_reg4 | Context1_gp_reg4 | Context2_gp_reg4 |
|   |   | 40d |   |   |
| 3 | 00011 | Gp_reg3 |   |   |
| 2 | 00010 | Gp_reg2 |   |   |
| 1 | 00001 | Gp_reg1 |   |   |
| 0 | 00000 | Gp_reg0 (hardwired to 0) |   |   |

Three sets of twenty-eight (##4–31) thirty-two bit wide registers are provided for use in three different contexts. Any one of these three sets of "context general purpose registers", is selected by the use of a new instruction or opcode, referred to herein as CXTS (context switch). The CXTS instruction is an immediate instruction and has a two-bit context code embedded in it. This allows the addressing of up to four sets of "context general purpose registers". According to the presently preferred embodiment, however, only three sets of "context general purpose registers" are used. The RALU control interprets the immediate CXTS instruction and asserts the two-bit "Con_sel" code via the line 62 in FIG. 3 which selects the appropriate bank of registers. The Con_sel code may be implemented in several different ways. According to the presently preferred embodiment, the bank of register sets is arranged so that each of the deselected banks ignores the address signals sent from the sequencer and the RALU controller. Another way in which the Con_sel code can be implemented is to provide a demultiplexer between the address lines and each of the sets of registers, the demultiplexer being operated by the Con_sel code to "switch" the address lines to the selected bank of registers. Still another way to implement the Con_sel code is to control multiplexers coupled to the A, B, and C ports. According to this implementation, addresses are received and acted upon by all of the sets of registers, but only the ports of the selected bank of registers are coupled to the ALU. A disadvantage of this implementation is that background context register loading is not possible. Those skilled in the art may appreciate that the AMUX and BMUX shown in phantom in FIG. 3 might be used to accomplish this implementation. However, the AMUX and BWUX may also be coupled to the alu_V output of the ALU and used as a "sneak path" to redirect the output of the ALU back to the input of the ALU, bypassing the register file 40, when desired, to improve performance.

In addition to the three sets of registers described above, the register file 40 includes a single set 40d of four thirty-two bit registers ##0–3 which are always selected and therefore available for use in every context. It will be appreciated that whichever set of registers is selected, the total number of general purpose registers available to the RALU during any processing cycle will be thirty-two, the same as in a MIPS processor and these thirty-two bit registers-will be read, written, and addressed in the same manner as the single set of thirty-two registers in a MIPS processor. As required by the MIPS specification, the register #0 always contains thirty-two zeros.

The three sets of "context general purpose registers" 40a–40c can be used at any given time for any function such as "User", "Kernel", and "AXI". The AXI designation refers to the "alternate context interface" according to the invention. According to the AXI, coprocessor access to a set of "context general purpose registers" which are not in use by the RALU is provided so that these registers may be loaded with data while the RALU is processing other instructions. The AXI is shown schematically in FIG. 3 by lines 64 and is described in more detail below with reference to FIG. 6.

The arrangement of registers shown in Table 1 and the implementation of a Con_sel code provides many significant advantages, particularly for real time event-driven applications. For example, during interrupt processing, when a MIPS processor normally switches context from user mode to kernel mode, the processor according to the invention need not save and restore register contents. The processor according to the invention can switch to kernel mode in three instruction cycles and back to user mode in another three instruction cycles. Further, more than two threads are rapidly supported by loading register contents in the background via the AXI port with a coprocessor. The provision of a set of context independent or common registers 40d allows for data to be available in several contexts without any need to save, restore, or duplicate data.

As compared to a conventional gate array or ASIC used in telecommunications applications, the present invention is approximately ten to twenty times more efficient when handling interrupts, switching foreground, background, and kernel tasks. The present invention can change contexts in three or four CPU clock cycles whereas a typical processor or gate array requires at least 31 cycles and possibly 62 clock cycles to change contexts. For example, in a conventional MIPS processor, an interrupted background task must save the contents of 31 registers (the RO register is hardwired and not used) which takes 31 processor cycles to complete. If the foreground task had not previously been completed, it must restore the contents of 31 registers which takes another 31 processor cycles to complete. If the background task needs to execute before the foreground is completed, the foreground task must save the contents of 31 registers and the background task must reload the contents of 31 registers. The worst case is 64 CPU cycles to switch to foreground and 64 CPU cycles to switch back to the background. In-many applications, the foreground tasks are always run to completion before switching back to a background task and in these applications, it takes only 31 cycles to switch to the foreground and only 31 to switch back to the background. An example of how the present invention switches context in only three or four CPU cycles is shown in the following code listing:

```
background (task 1, context 2)

lw       r6, data1           ; direct memory load to r6
lw       r7, data2           ; direct memory load to r7
lw       r8, offset($sp)     ; indirect memory load to r8
--interrupt occurs here--
switchfg mfc0     r31, C0_EPC         ; loads r31 with address to return to
sw       r31, k0-return      ; stores r31 in kernel ram location k0
ctx1                         ; change to foreground (task 2, context1)
jal      foreground          ; jump and link to foreground task
nop
returnbg ctx2                         ; change to background (context 2)
lw       r31, k0-return      ; puts return address from k0 into r31
jr       r31                 ; jumps to address in r31 and executes
rfe
foreground (task 2, context 1)

lw       r4, data0
lw       r6, data1
lw       r8, offset($sp)
--task 2 continues until completion with interrupts disabled--
jr       r31                 ; jump to returnbg
```

In the code listing above, it is assumed that context 1 is used for the foreground application, also known as task 2, and context 2 is used for the background application, also known as task 1. According to a presently preferred embodiment of the invention, context 0 is reserved for the kernel.

As shown in the code listing, the background application is in the process of loading several of its registers (r6–r8) when an interrupt occurs. According to the invention, it is not necessary for the background application to save the contents of any registers because it has its own registers. Instead, the context switch of the invention switches banks of registers. Thus, all that is required for properly returning to the background is the pointer from the program counter which is part of coprocessor 0 according to MIPS convention. When the background task is interrupted, the routine labelled switchfg is run. The first action taken by switchfg is to get the pointer from the exception program counter (coprocessor 0) and load it into register 31 of context 2 and store it in a reserved location of kernel RAM before switching to context 1. The switchfg routine then changes the context to the set of registers of context 1 and jumps and links to the foreground task (task 2, context 1). The foreground task begins execution and uses its register set when needed without regard for the contents of the register sets of the other contexts. Thus, as shown in the code listing, the foreground task may use registers having the same numbers (e.g. r6, r8) as registers previously used by the background task. However, these are not the same registers because, according to the invention, the foreground and background tasks have separate banks of registers as indicated in Table 1.

According to the example, the foreground task continues to completion with interrupts disabled and then jumps to r31 of context 1 which contains the address of the routine returnbg. The returnbg routine switches context to context 2 (the background task which was interrupted), loads r31 of context 2 with the pointer from kernel RAM k0 (which was stored at that location by the switchfg routine), and jumps to the pointer location to continue execution of the background task.

Figure 4:
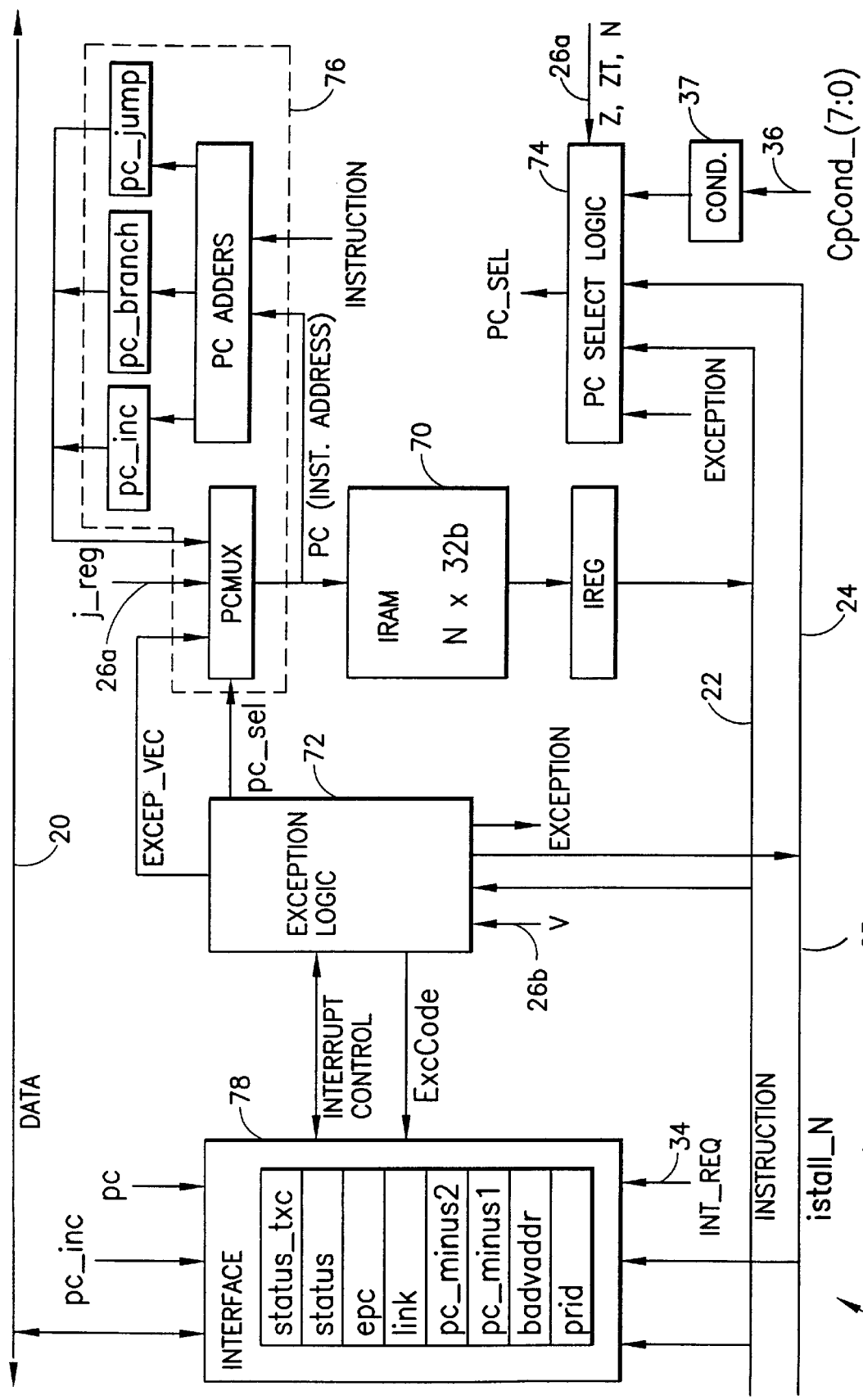
FIG. 4 is a schematic block diagram of the major functional blocks of the sequencer of FIG. 2.

Referring now to FIG. 4, the sequencer 12 of the processor of the invention generally includes an instruction RAM (IRAM) 70, exception processing logic 72, program counter select logic 74, program counter increment logic 76, and an interface 78. The interface 78 includes the registers which are loaded and stored from the data bus 20. Most of these registers are involved in exception processing. The prid register is read only and is burned at the foundry to contain an identification number for the processor. Using information stored in these registers, the exception logic 72 determines whether an exception is to be taken and, if so, which one.

If an exception is recognized, the exception logic 72 activates an exception signal which is provided to the pc select logic 74. As a result, the pc select logic generates an EXCEP_VEC message to the program counter increment logic. The upper bits of the EXCEP_VEC message are hardwired and the lower bits depend on the particular interrupt or trap which caused the exception. If the cause is a trap, the trap number is loaded into the cause register in the interface 78 and a trap handler in the exception logic 72 determines the cause of the trap under software control. According to the invention, if the cause of the exception is an interrupt, the EXCEP_VEC is different for each interrupt.

At the start of the IF stage, the pc select logic 74 generates one of five possible messages: j_reg (jump to a register), pc_inc (normal program counter increment), pc_branch (branch taken), pc_jump (jump taken), or EXCEP_VEC (exception taken).

If a jump to a register instruction is decoded in the SF stage, the pc select logic will generate a j_reg message for selecting an IRAM location. If the instruction on the instruction bus 22 is a branch instruction, the Z, ZT, and N flags from the RALU as well as the coprocessor condition flags (registered locally at 37) are all tested by the pc select logic 74. If the selected condition code is true, the pc select logic 74 generates a pc-branch message. In the absence of these conditions, the pc select logic defaults to generate a pc_inc message.

Branch addresses are computed by adding a sixteen bit two's complement offset to the pc instruction address during the SF stage. Jump addresses select twenty-six bits from the absolute field of the J-format instruction into the pc_jump register. In the event that a branch is taken or a jump is decoded, exactly one delay slot following the branch or the jump will be executed. The program counter increment logic 76 includes independent incrementer pc_inc and adder pc_branch because the pc_select logic decodes the appropriate conditions during the same cycle in which the next pc adds must take place (assuming a single delay slot).

If JAL or JALR is executed, the address of the instruction following the delay slot is stored in one of the general purpose registers. In this case the LINK register in the interface block 78 is loaded with pc_inc for later output to DATA. The pc_minus1 and pc_minus2 registers are prior copies of the pc. The pc_minus1 is loaded into the epc register if an exception is taken during an instruction. The pc_minus2 is loaded into the epc register if an exception is taken during a delay slot following a branch or jump.

As shown in FIG. 4, the sequencer 12 is also coupled to a bus 23 labelled istall_N which is actually one bit of a bus which is a companion to the instruction bus. The istall_N bus is pulled low by the exception logic 72 when an exception is taken and this invalidates two instructions in the pipeline.

The processor according to the invention does not provide on-chip TLB and consequently does not provide a context register or additional COPO registers found in a MIPS processor. The register (badvaddr) stores the address of the instruction causing an address exception error. The processor according to the invention extends MIPS exception handling by adding support for eight coprocessors rather than four, by providing additional interrupt signals, and by providing quicker real time response to interrupt signals.

The processor according to the invention supports nested exceptions. However, if a second interrupt is not serviced because the core is servicing a first interrupt, the second interrupt may be lost if the condition causing it has cleared before the first interrupt is serviced. Accordingly, it is recommended that an external register or latch be provided to latch a high interrupt signal while the core is servicing another interrupt.

As alluded to above, the processor according to the invention implements the epc register in a manner different from the conventional MIPS ISA. According to the invention, in the case of an overflow exception, the epc does not indicate the instruction which caused the exception, but two instructions after the one causing the exception. Also, unlike the MIPS R-4000, the RFE (return from exception) instruction in the inventive processor does not restore the epc to the pc. The program should first move the epc to a general purpose register and exit the exception handler using a JR instruction.

The present invention also adds a second status register to the interface block 78. The additional register, status_txc, accommodates the additional coprocessors and masks for additional interrupt signals. This leaves the MIPS status register unaltered and preserves MIPS compatibility.

Figure 5:
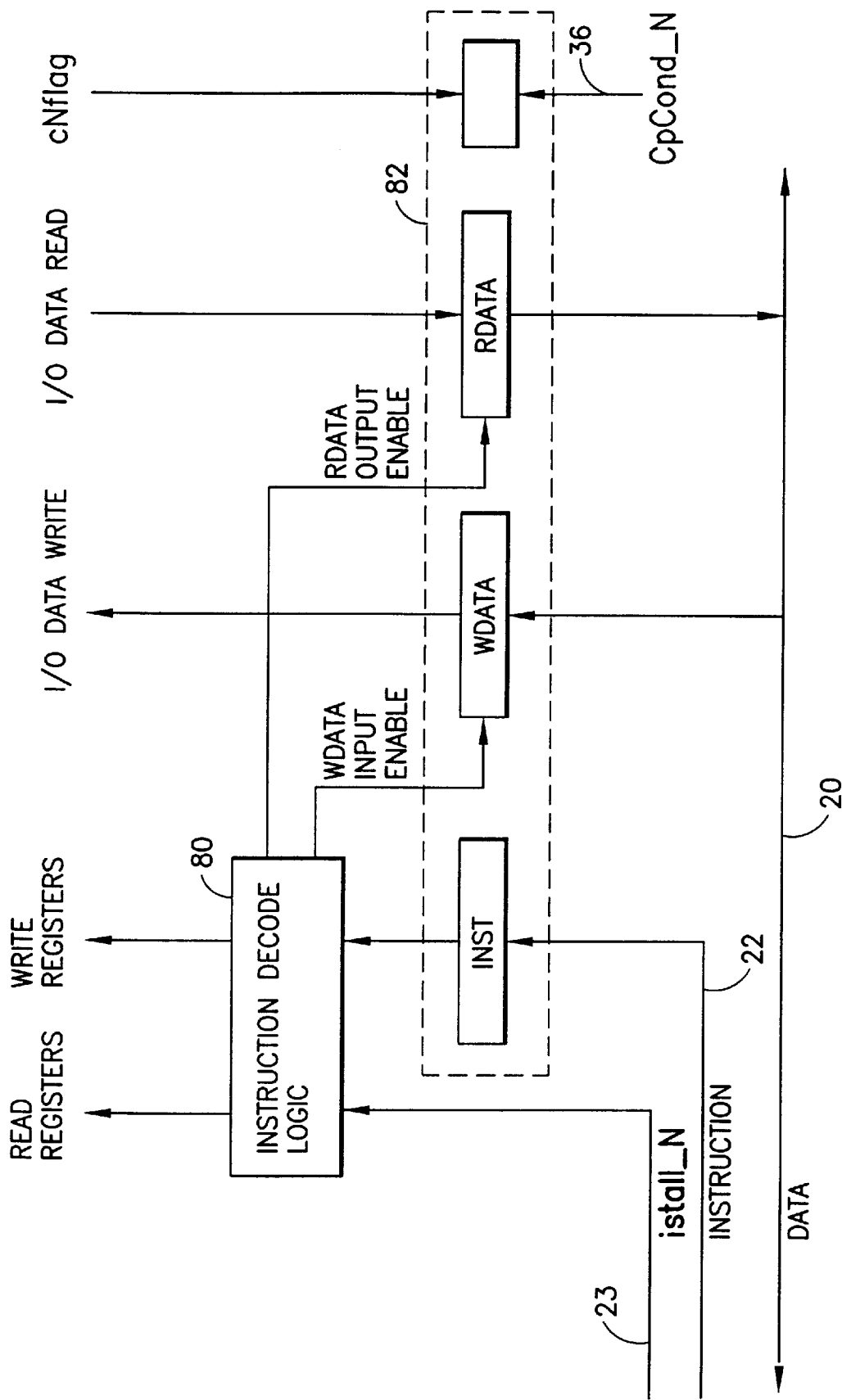
FIG. 5 is a schematic block diagram of the major functional blocks of the coprocessor interface of FIG. 2.

Turning now to FIG. 5, a coprocessor interface 18 according to the invention generally includes instruction decoding logic 80 and several data flow registers 82. The instruction decoding logic 80 "eavesdrops" on the instruction bus 22 and the istall_N signal 23. Instructions are registered locally and decoded during the EX stage to determine whether it is a coprocessor instruction, and if so, what type. If the instruction is a coprocessor instruction, local registers and data may be read or written as required by the instruction. Each coprocessor is assigned one condition code flag CpCond_N where N is the coprocessor number which is provided to the sequencer. A cNflag generated by a specific coprocessor is clocked through a one bit register and transmitted to the sequencer as CpCond_N via line 36.

As mentioned above, the presently preferred processor according to the invention is MIPS ISA compatible with some MIPS instructions not implemented and some new instructions added. The MIPS instructions not implemented in the presently preferred embodiment are: MFHI, MTHI, MFLO, MTLO, MULT, MULTU, DIV, DIVU, TLBR, TLBWI, TLEWR, and TLBP. The multiply and divides and the moves of the multiply/divide registers HI and LO do not offer significant performance benefit for I/O intensive applications, occupy non-trivial area, and have some impact on fundamental critical paths. The TLB instructions are not implemented as the presently preferred embodiment does not include an on-chip TLB.

The new instructions added by the invention to the MIPS ISA are all related to enhanced coprocessor functionality, booting of instruction RAM, and context switching. In particular, the MIPS instructions COPz, LWCz, and SWCz have been extended to include addresses for coprocessors 4–7, i.e. z=4, 5, 6, and 7. All of the MIPS coprocessor operations have also been extended to account for four additional coprocessors. In addition, coprocessor general register address space for move to and move from instructions has been expanded from 32 to ($2^{16}$–1). Instructions LWI and SWI have been added for booting instruction RAM. As mentioned above, the CXTS instruction has been added to switch context general purpose register sets.

The opcodes assigned to COP4 through COP7 are unused by any of the R-2000 through R-6000 MIPS processors. The opcodes assigned to LWC4 through LWC7 and SWC4 through SWC7 are unused by the R-2000/R-3000 MIPS processors but are used by the R-4000 for other instructions. Some of the opcodes assigned to new instructions would have resulted in an reserved instruction (RI) trap on the R-2000 processor. For this reason and other critical path reasons, the RI trap signal has been eliminated from the presently preferred embodiment.

The LWI and SWI instructions are designed to be used in conjunction with a boot ROM (or a prebooted boot RAM) for loading a word into IRAM and for storing a word from IRAM.

According to a presently preferred embodiment, the CXTS instruction takes the form shown in Table 2 below.

TABLE 2

| 31 ... 26 | 25 24 | 23 ... 6 | 5 ... 0 |
|---|---|---|---|
| 000000 | Con_sel | 000000000000000000 | 001110 |

The thirty-two bit CXTS instruction includes six leading zero bits (bit locations 31 through 26), the two bit context code Con_sel which is an integer 0, 1, or 2 (bit locations 25 and 24), eighteen zero bits (bit locations 23 through 6), and six bits indicating the CXTS instruction (bit locations 5 through 0). The leading six zero bits indicate that the instruction is "special". The Con_sel integer values are also shown in Table 1.

The AXI context is accessed through a new interface, the Alternate Context Interface (64 in FIG. 3), which allows loading of the context registers which are not currently in use. The Alternate Context Interface is implemented with several new instruction signals (implemented as a co-processor specific command set) and an interrupt scheme. The command set generally includes a read signal (axi_rdata), an address signal, (axi_addr), a write data signal (axi_wdata), a context select signal (axi_con_sel), and separate write enable signal for each context (axi_wen_0, axi_wen_1, axi_wen_2).

Figure 6:
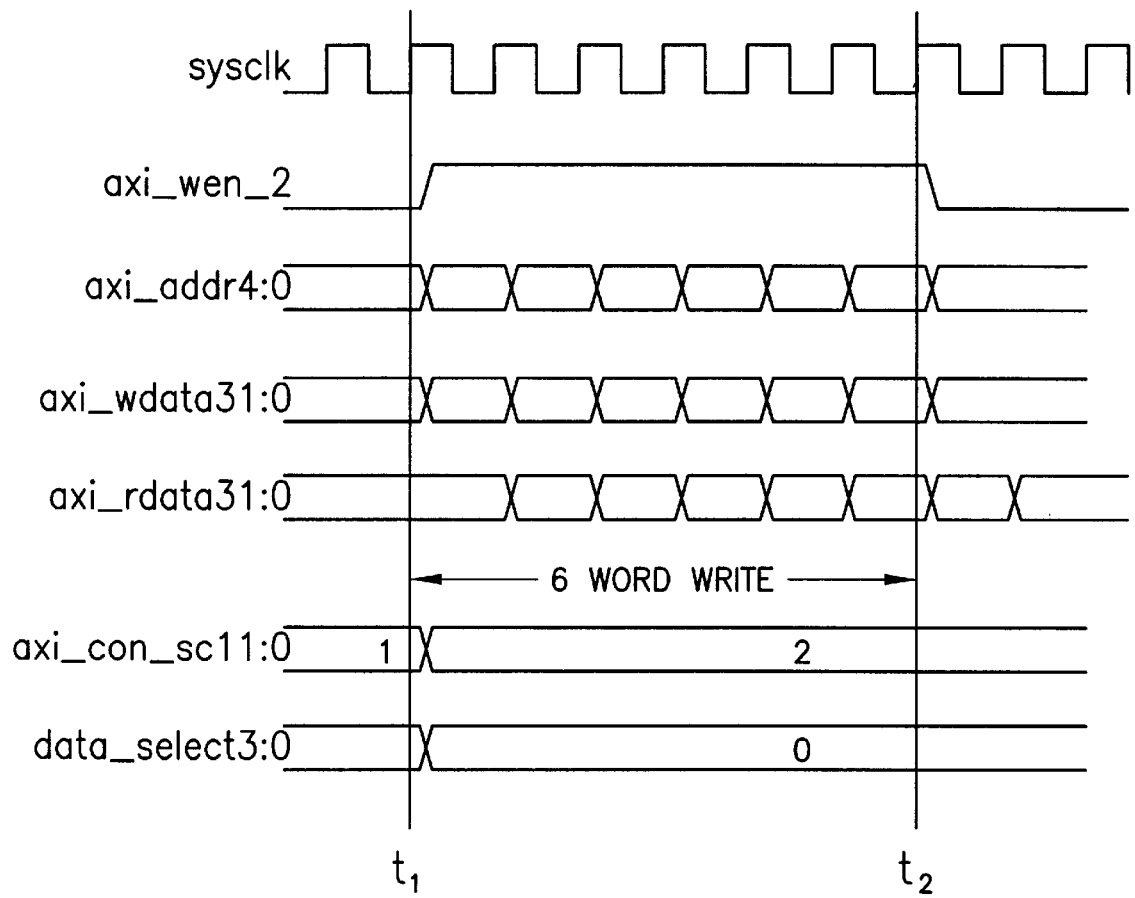
FIG. 6 is a timing diagram of the waveforms of key signals of the alternate context interface of the invention.

Waveforms of the key signals in the AXI interface are shown in FIG. 6. As shown in FIG. 6, at time t1, the two bit axi_con_sel signal changes from 01 to 10, indicating access to context 2. The one bit write enable signal for context 2 (axi_wen_2) is brought high, and during the next six clock cycles (ending at t2), six words are written to the address(es) selected with the axi_addr signal. The address signal is a five bit signal which corresponds to the register addresses shown in Table 1, above. After the first word write, the axi_rdata signal outputs the data selected by axi_addr, but delayed by one clock. It will be appreciated that since the MIPS architecture is pipelined, it is critical to get beyond all of the register writes in the selected context before the main processor is allowed to switch contexts. In general, no register stores should be attempted within two instructions before a CXTS instruction.

As mentioned above, the alternate context interface of the invention requires an external coprocessor. However, no requirements are set as to how the interface is used. The details of managing transfers, which interrupts are required, etc. are left to the developer. According to the presently preferred embodiment, the processor according to the invention supports a fifteen bit int_req signal so that fifteen hardware interrupts can be implemented.

A RISC processor with enhanced context switching has been described and illustrated. While particular embodiments of the invention have been described, it is not intended that the invention be limited thereto, as it is intended that the invention be as broad in scope as the art will allow and that the specification be read likewise. Thus, while three sets of general purpose registers have been shown for switching among three contexts, it will be appreciated that more or fewer sets of registers could be utilized. Also, while certain opcodes have been shown for switching contexts and controlling coprocessors, it will be recognized that other opcodes could be used with similar results obtained. Moreover, while particular configurations have been disclosed in reference to the addressing of and data access to general purpose register sets, it will be appreciated that other configurations could be used as well. Furthermore, while the processor has been disclosed as being a RISC processor with a specifically modified MIPS architecture, it will be understood that different modifications to MIPS architecture can achieve the same or similar function as disclosed herein. For example, several of the MIPS instructions which are not implemented by the invention could be implemented without sacrificing the functionality of the invention. In addition, the multiple sets of general purpose registers with context switching could be implemented without the alternate context interface and still obtain some of the advantages of the invention. Also, the number of common registers which are not switched during a context switch could be more or fewer than the four shown. Those skilled in the art will also appreciate that the context switching with multiple sets of general purpose registers, with or without the alternate context interface, could be implemented in processors other than a MIPS RISC processor. For example, the invention could be implemented within the architecture of other RISC processors such as the PowerPCN processor or even within the architecture of a CISC processor such as the Pentium™ processor. It will therefore be appreciated by those skilled in the art that yet other modifications could be made to the provided invention without deviating from its spirit and scope as so claimed.

What is claimed is:

1. A processor, comprising:
   a) an instruction sequencer;
   b) an instruction RAM associated with said instruction sequencer;
   c) a data bus and an instruction bus, said instruction sequencer being coupled to said data bus and said instruction bus;

c) an arithmetic logic unit coupled to said data bus and said instruction bus;

d) a plurality of general purpose registers associated with said arithmetic logic unit, said plurality of general purpose registers being arranged as at least two sets; and e) means for exclusively selecting each set, one at a time, for access by said arithmetic logic unit in response to an instruction from said instruction sequencer;

f) a shared set of general purpose registers which are always accessible to said arithmetic logic unit regardless of which one of said at least two sets is selectively and exclusively accessed; and g) coprocessor interface means for coupling a coprocessor to at least one of said two sets of registers when said at least one of said two sets of registers is not exclusively selected for access by said arithmetic logic unit such that the coprocessor can load said at least one of said two sets of registers when it is not being accessed by said arithmetic logic unit.

2. A processor according to claim 1, wherein:

each of said at least two register sets includes twenty-eight registers.

3. A processor according to claim 1, wherein:

said plurality of general purpose registers are arranged in at least three sets and said means for exclusively selecting selects register sets in any order.

4. A processor according to claim 3, wherein:

said at least two register sets includes three sets of registers, each set of registers including 32−n registers, and said shared set of general purpose registers includes n registers.

5. A processor according to claim 4, wherein:

n=4.

6. A processor according to claim 4, wherein:

each of said general purpose registers is thirty-two bits wide.

7. A processor according to claim 1, wherein:

said instruction includes a an embedded code indicating which set is exclusively selected.

8. A processor according to claim 7, wherein:

said embedded code is a two bit code.

9. A processor according to claim 1, wherein:

said processor is a RISC processor and executes instructions in a pipeline.

10. A processor according to claim 1, wherein:

said means for exclusively selecting includes means for instructing all but the selected set to ignore addressing signals.

11. A processor according to claim 1, wherein:

said means for exclusively selecting includes means for coupling and uncoupling addressing ports of each set to said arithmetic logic unit.

12. A processor according to claim 1, wherein:

said means for exclusively selecting includes means for coupling and uncoupling data ports of each set to said arithmetic logic unit.

13. A processor according to claim 1, wherein:

said instruction from said instruction sequencer is executed in three instruction cycles.

14. A processor according to claim 1, wherein:

said means for exclusively selecting includes a separate write enable line for each set.

15. A processor according to claim 8, wherein:

said instruction is thirty-two bits, said thirty-two bits including said two bit code, a first plurality of bits indicating that said instruction is special, and a second plurality of bits indicating that the instruction is to select one of said sets.

16. A processor, comprising:

a) an arithmetic logic unit;

b) a first set of general purpose registers;

c) a second set of general purpose registers;

d) a third set of general purpose registers;

e) means for selecting one of said first or second sets of general purpose registers for use by said arithmetic logic unit said third set of general purpose registers being always accessible to said arithmetic logic unit regardless of which one of said at least two sets is selectively and exclusively accessed; and e) interface means for accessing the other of said first or second sets which is not selected for use by said arithmetic logic unit, wherein said interface means provides read, write, and address access to said set of general purpose registers which is not selected for use by said arithmetic logic unit.

17. A processor according to claim 16, wherein:

each of said sets of general purpose registers has an address port and a data port, and said means for selecting includes means for enabling and disabling said address ports.

18. A processor according to claim 16, wherein:

each of said sets of general purpose registers has an address port and a data port, and said means for selecting includes means for coupling and uncoupling said data ports to said arithmetic logic unit.

19. A processor according to claim 16, wherein:

said means for selecting is responsive to a software command.

20. A processor according to claim 16, further comprising:

f) coprocessor means coupled to said interface means for accessing said set of general purpose registers which is not selected for use by said arithmetic logic unit.

* * * * *